United States Patent [19]

Jun

[11] Patent Number: 5,442,410
[45] Date of Patent: Aug. 15, 1995

[54] VIDEO CASSETTE RECORDER HAVING VARIABLE, HIGH-RESOLUTION VIDEO SCREEN ZOOMING

[75] Inventor: Yong J. Jun, Seoul, Rep. of Korea

[73] Assignee: Goldstar Co., Ltd., Seoul, Rep. of Korea

[21] Appl. No.: 12,138

[22] Filed: Jan. 29, 1993

[30] Foreign Application Priority Data

Jan. 31, 1992 [KR] Rep. of Korea .......... 1551/1992

[51] Int. Cl.⁶ .......................................... H04N 5/262
[52] U.S. Cl. ..................................... 348/704; 348/581
[58] Field of Search .............. 348/581, 704, 240; H04N 5/262; 360/27, 32, 61

[56] References Cited

U.S. PATENT DOCUMENTS

| | | | |
|---|---|---|---|
| 4,163,249 | 7/1979 | Michael et al. | 348/581 |
| 4,722,007 | 1/1988 | Fling | 348/704 |
| 4,963,981 | 10/1990 | Todaka et al. | 348/240 |
| 4,991,022 | 2/1991 | Canfield et al. | 348/581 |
| 5,107,254 | 4/1992 | Choi | 348/704 |
| 5,125,043 | 6/1992 | Karlsson | 348/581 |
| 5,153,728 | 10/1992 | Nakayama et al. | 348/704 |
| 5,253,064 | 10/1993 | Yamamoto et al. | 348/240 |

Primary Examiner—Victor R. Kostak
Assistant Examiner—John W. Miller
Attorney, Agent, or Firm—Finnegan, Henderson, Farabow, Garrett & Dunner

[57] ABSTRACT

A video cassette recorder has a video screen zooming function, capable of zooming an optional region of one of plural still pictures sequentially displayed on a screen, as one picture. A digital signal processing unit converts composite video signals into digital video signals and a first memory unit stores the digital video signals by frames. A zoom signal processing unit zooms only digital video signals corresponding to a predetermined zoom region from the digital video signals so as to reconfigure them as digital video signals corresponding to one frame. A second memory unit stores the zoomed digital video signals by frames. A first switch selects the digital video signals from the first memory unit in a stop mode or digital video signals from the second memory unit in a zoom mode. Under a control of a control signal generating unit, an RGB matrix circuit reconfigures the digital video signals from the first switch unit as R, G and B color analog signals, and a second switch selects and outputs original composite video signals in a playback mode and outputs signals from the RGB matrix circuit in the stop mode or the zoom mode, under control of the control signal generating unit.

4 Claims, 8 Drawing Sheets

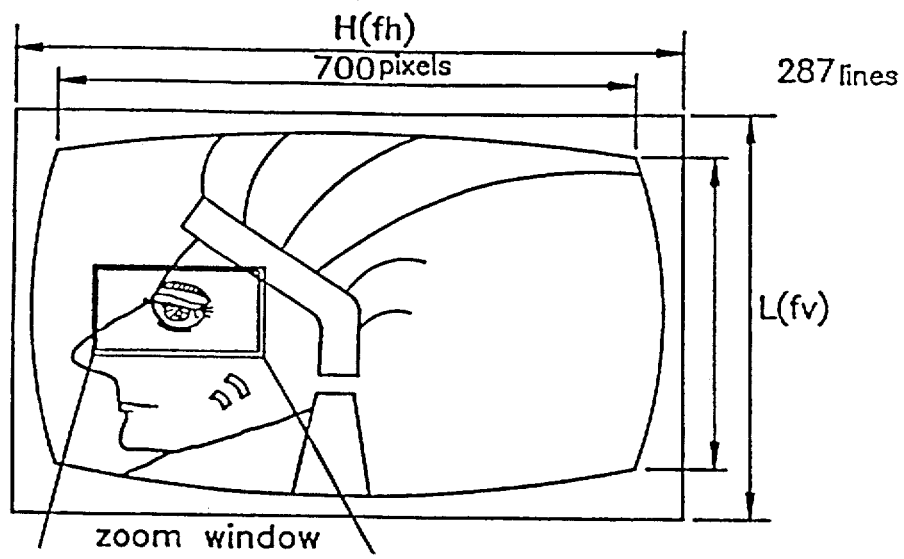
FIG. 3a
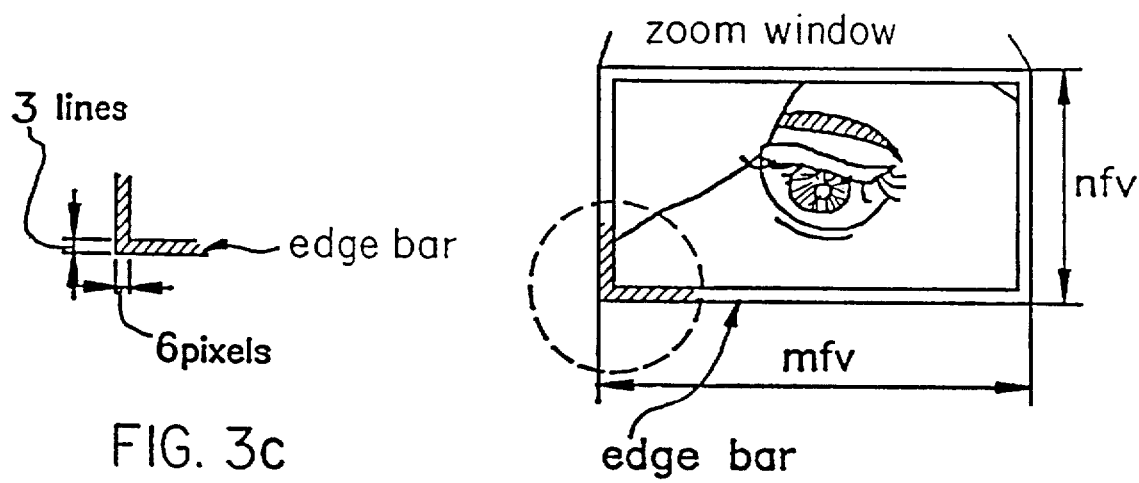
FIG. 3c
FIG. 3b
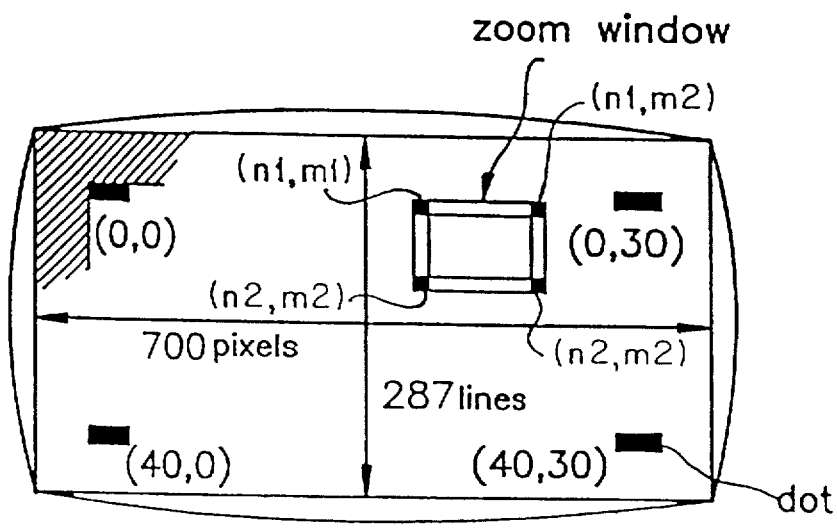
FIG. 4 blanking interval mfh f simulation

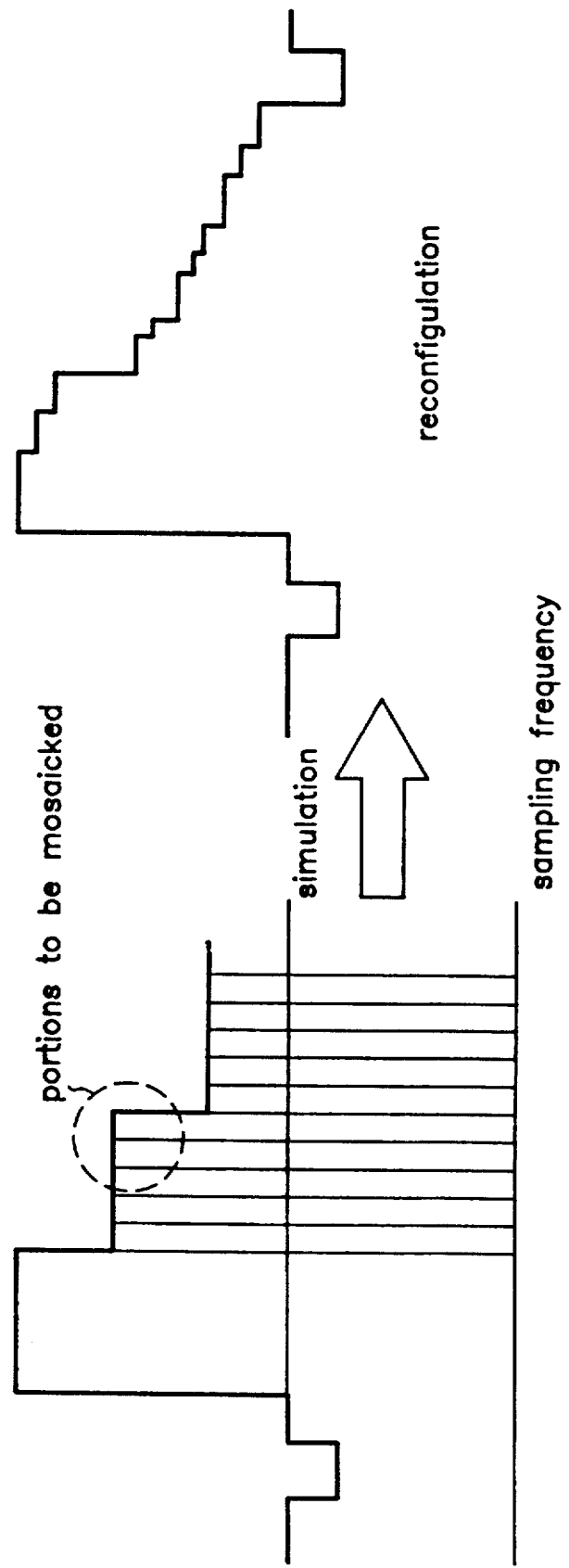

VIDEO CASSETTE RECORDER HAVING VARIABLE, HIGH-RESOLUTION VIDEO SCREEN ZOOMING

BACKGROUND OF THE INVENTION

1. Field of the Invention

The present invention relates to video cassette recorders, and more particularly to a video cassette recorders having a video screen zooming function, capable of zooming a selectable region of one of plural still pictures sequentially displayed on a screen, as one picture and of improving the resolution of the zoomed picture.

2. Description of the Prior Art

Conventional video cassette recorders (VCRs) with a zooming function have limitations on regions to be zoomed and a zoom size and thereby have limited variety of zooming. Since the sampling intervals are extended upon zooming in conventional VCRs, a zoomed picture is mosaicked, thereby causing the resolution to be degraded.

SUMMARY OF THE INVENTION

The present invention has been made in view of the above circumstances and has as an object to provide a video cassette recorder with a video screen zooming function, that is capable of zooming a selectable region of plural one of still pictures sequentially displayed on a screen, as one picture and of improving the resolution of the zoomed picture.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a video cassette recorder of this invention comprises digital signal processing means for receiving composite video signals in a stop mode and converting the composite signals into digital video signals. First memory means are provided for receiving the digital video signals from the digital signal processing means and for storing the digital video signal by frames.

Control signal generating means are provided for receiving signals for operation modes of the video cassette recorder and generating first to third control signals corresponding to the received signals. Zoom signal processing means receive digital video signals corresponding to one frame from the first memory means, according to the third control signal generated in the control signal generating means in a zoom mode and zooming only digital video signals corresponding to a predetermined zoom region from the received digital video signals, so as to reconfigure them as digital video signals corresponding to one frame. Second memory means receive the zoomed digital video signals from the zoom signal processing means and store them by frames therein. First switch means select the digital video signals corresponding to one frame from the first memory means in the stop mode and digital video signals corresponding to one frame from the second memory means in the zoom mode, according to the first control signal from the control signal generating means. A RGB matrix circuit receives digital video signals corresponding to one frame via the first switch means and reconfigures them as R, G and B color analog signals. Second switch means for selecting and outputs original composite video signals in a playback mode and outputs signals from the RGB matrix circuit in the stop mode or the zoom mode, according to the second control signal of the control signal generating means.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings:

FIG. 3A-3C are views which represent a video screen with a predetermined zoom region in accordance with the present invention;

FIG. 4 is a schematic view of a zoom window defined by matrix coordinates in accordance with the present invention;

FIGS. 9a and 9b are waveform diagrams illustrating the operation of the simulator in accordance with the present invention.

DETAILED DESCRIPTION OF THE PREFERRED EMBODIMENTS

Figure 1:
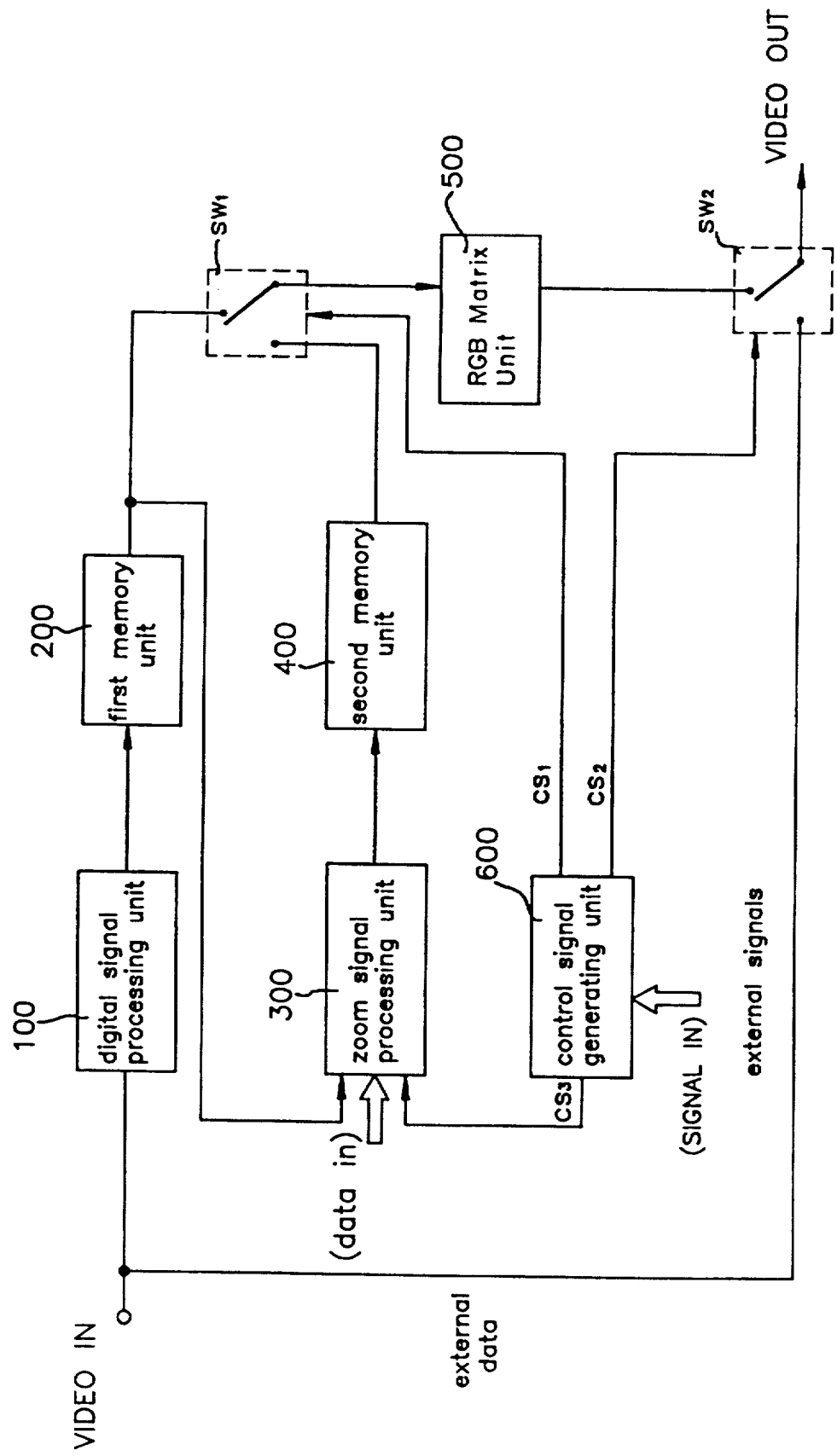
FIG. 1 is a block diagram of a VCR with a video screen zooming function in accordance with the present invention.

Referring to FIG. 1, there is shown a block diagram of a VCR with a video screen zooming function in accordance with the present invention.

As shown in FIG. 1, the VCR comprises a digital signal processing unit 100 for receiving composite video signals VIDEO IN in a stop mode and converting them into digital video signals and a first memory unit 200 for receiving the digital video signals from the digital signal processing unit 100 and storing them by frames therein. In accordance with the present invention, the VCR also comprises a zoom signal processing unit 300 for receiving digital video signals corresponding to one frame from the first memory unit 200 and zooming only digital video signals corresponding to a predetermined zoom region from the received digital video signals, so as to reconfigure them in the form of digital video signals corresponding to one frame. The operation of the zoom signal processing unit 300 is controlled by a third control signal CS3 outputted from a control signal generating unit 600, in a zoom mode. The control signal generating unit 600 is adapted to receiver external signals SIGNAL IN for respective operation modes of the VCR and to output corresponding first to third control signals $CS_1$ to $CS_3$. A second memory unit 400 is also provided to receive the zoomed digital video signals from the zoom signal processing unit 300 and store them by frames therein. The VCR further comprises a first switch unit $SW_1$ for selecting output signals from the first memory unit 200 in the stop mode and output signals from the second memory unit 400 in the zoom mode, according to the first control signal $CS_1$ from the control signal generating unit 600. A RGB matrix circuit 500 is provided for receiving digital video signals corresponding to one frame via the first switch unit $SW_1$ and reconfiguring them in the form of R, G and B color analog signals. A second switch unit $SW_2$ is provided for selecting and outputting original composite video signals in a playback mode and output signals from the RGB matrix circuit 500 in the stop mode or the zoom mode, according to the second control signal $CS_2$ of the control signal generating unit 600.

Figure 2:
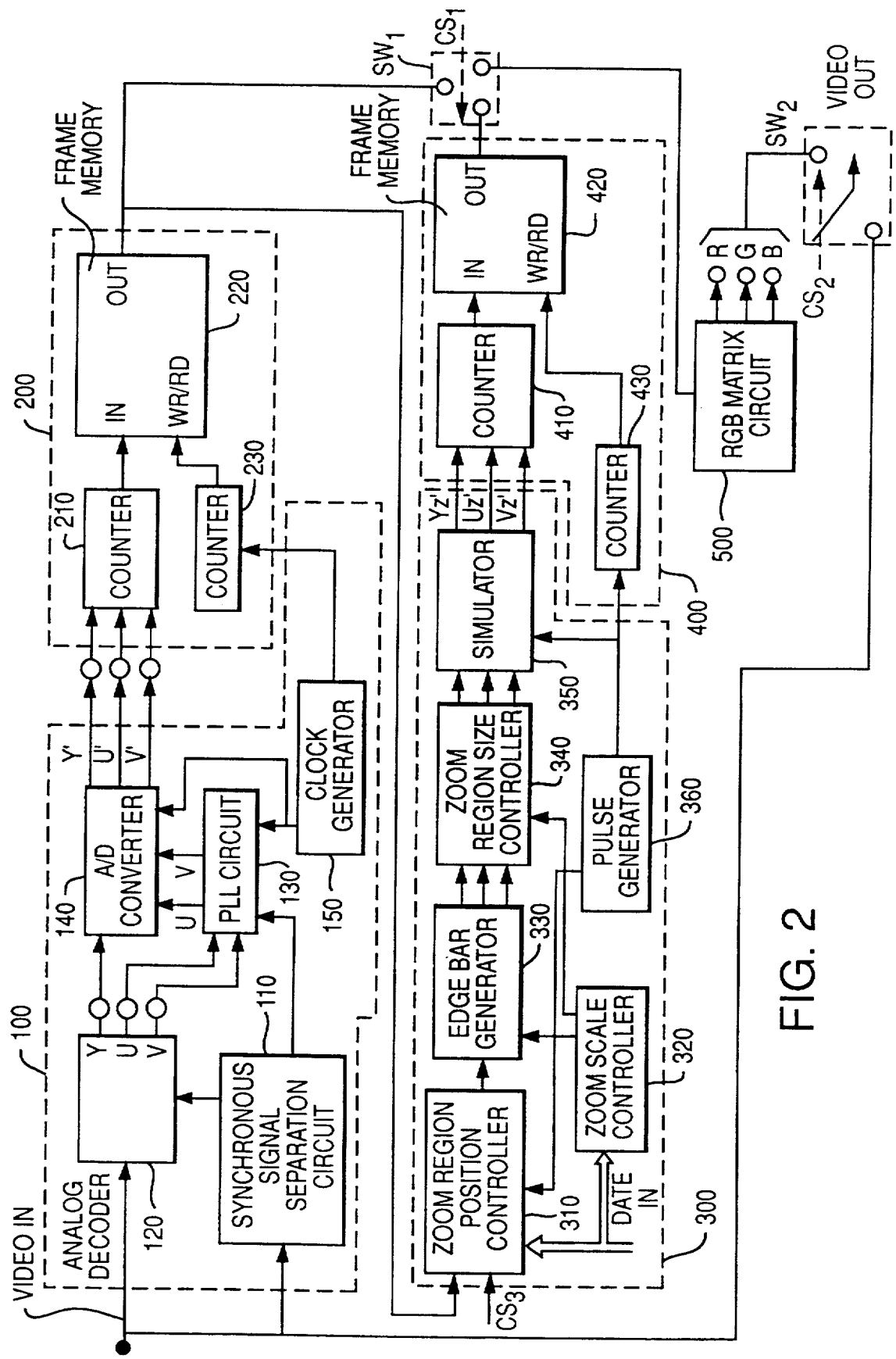
FIG. 2 is a detailed block diagram of the VCR shown in FIG. 1.

FIG. 2 is a circuit diagram of the VCR shown in FIG. 1.

As shown in FIG. 2, the digital signal processing unit 100 comprises a synchronous signal separation circuit 110 for receiving composite video signals VIDEO IN and separating synchronous signals from the composite video signals VIDEO IN. The separated synchronous signals are adapted as reference signals for subsequently processing the composite video signals VIDEO IN. The digital signal processing unit 100 also comprises an analog decoder 120 that receives the composite video signals VIDEO IN and the synchronous signals from the synchronous signal separation circuit 110 and separates them into luminance signals Y and color difference signals U and V ($U \equiv R - Y$ and $V \equiv B - Y$) using the synchronous signals as reference signals and a signals. A PLL circuit 130 receives the color difference signals U and V as vector phase signals from the analog decoder 120 and the synchronous signals from the synchronous signal separation circuit 110 and converts the color difference signals U and V into analog signals. An analog/digital converter 140 receives analog luminance signals Y from the analog decoder 120 and the analog color difference signals U and V from the PLL circuit 130 and converts them into digital luminance signals Y' and digital color difference signals U' and V'. A clock generator 150 also sends clock signals to the PLL circuit 130.

The first memory unit 200 comprises a counter 210 for receiving and decimal counting output signals from the analog/digital converter 140 of the digital signal processing unit 100. A frame memory 220 for receives output signals from the counter 210 and stores them by frames. The first memory unit 200 also comprises a counter 230 that receives the clock signals from the clock generator 150 of the digital signal processing unit 100 and controls write and read operations of the frame memory 220 according to the clock signals.

The zoom signal processing unit 300 comprises a zoom region position controller 310 that receives the digital video signals corresponding to one frame from the frame memory 220. The zoom region position controller 310 controls positions of dots generated according to the third control signal $CS_3$ from the control signal generating unit 600. A zoom scale controller 320 receives data DATA IN applied externally and outputs zoom scale factors that determine the area of a zoom window. An edge bar generator 330 receives output signals from the zoom scale controller 320 and generates edge bars to form the zoom window according to the received signals. The zoom signal processing unit 300 further comprises a zoom region size controller 340 for zooming digital video signals corresponding to one frame in the zoom window formed by the edge bar generator 330 according to the zoom scale factors outputted from the zoom scale controller 320. A simulator 350 receives the video signals corresponding to one frame from the zoom region size controller 340 and takes average values of data for adjacent pixels and interpolates them. A pulse generator 360 sends pulse signals to the zoom scale controller 320, the zoom region position controller 310 and the simulator 350.

The second memory unit 400 comprises a counter 410 for receiving and decimal counting zoomed video signals from the simulator 350 of the zoom signal processing unit 300. A frame memory 420 receives the video signals from the counter 410 and stores them by frames. In addition, a counter 430 receives output signals from the pulse generator 360 and controls write and read operations of the frame memory 420 according to the received signals.

Now, operation of the VCR with the above-described construction according to the present invention will be described.

In the playback mode of the VCR, the composite video signals VIDEO IN are outputted in the form of original composite signets without being digitally processed, via the second switch unit $SW_2$, according to the second control signal $CS_2$ outputted from the control signal generating unit 600. Accordingly, reproduced pictures are continuously displayed on a TV screen at a normal rate.

When a signal for the stop mode is applied during the playback operation of the VCR, the composite video signals VIDEO IN are applied to the analog decoder 120 in which the composite video signals VIDEO IN are separated into luminance signals Y and color difference signals U and V with vector phase angles, The composite video signals VIDEO IN are also inputted to the synchronous signal separation circuit 110 in which synchronous signals are separated from the composite video signals VIDEO IN. The separate synchronous signals are applied to the decoder 120 and the PLL circuit 130 as reference signals.

The luminance signals Y separated from the composite video signals VIDEO IN by the analog decoder 120 are directly applied to the analog/digital converter 140 and then converted into digital luminance signals Y'. On the other hand, the color difference signals U and V with vector phase angles are processed as analog signals in the PLL circuit 130. Resultant analog color difference signals U and V are then applied to the analog/digital converter 140 and then converted into digital color difference signals U' and V'.

That is, the analog/digital converter 140 quantizes the received analog video signals Y, U and V with predetermined sampling frequencies and thus outputs digital video signals Y', U' and V' each having n bits. The digital video signals Y', U' and V' are applied to the counter 210 of the first memory unit 200.

The PLL circuit 130 of the digital signal processing unit 100 controls the color difference signals U and V, using the separated synchronous signals separated from the synchronous signal, separation circuit 110 as reference signals. Clock signals required for the PLL control are supplied from the clock generator 150.

The digital video signals Y', U' and V' are decimal-counted and then sequentially stored by frames in the frame memory 220. The counter 230 receives clock signals from the clock generator 150 and thereby controls the write and read operations of the frame memory 220.

The first switch unit $SW_1$ is connected to an output terminal of the frame memory 220 of the first memory unit 200 in the stop mode of VCR, according to the first control signal $CS_1$ outputted from the control signal generating unit 600. The digital video signals stored by frames in the frame memory 220 are acordingly applied to the ROB matrix circuit 500 via the first switch $SW_1$. The RGB matrix circuit 500 reconfigures the digital video signals Y', U' and V' received therein and outputs analog color signals R, G and B.

In the stop mode or the zoom mode other than the normal playback mode, the control signal generating unit 600 (FIG. 1) outputs the second control signal $CS_2$, so that the second switch $SW_2$ is connected to an output terminal of the RGB matrix circuit 500. As a result, the video signals outputted from the ROB matrix circuit 500 are processed as a still frame and then displayed on a TV screen.

The zooming operation of the zoom signal processing unit 300 will be now described.

When the user wants to zoom a desired region of a still picture displayed on the TV screen, as shown in FIG. 3, a zoom mode signal is input to the VCR by operating on a corresponding key. In response to the inputted zoom mode signal, the control signal generating unit 600 outputs the third control signal $CS_3$. Accordingly, dots each having a size of 6 lines × 18 pixels are displayed on the screen and the coordinates of dots are stored in the form a matrix.

In case of a screen of the PAL system with 700 pixels × 287 lines, the coordinates (n,m) of dots are defined such that n is 0 to 40 and m is 0 to 30. In this case, the coordinates of dots have the matrix form of 40×30.

When external data about dot position is inputted under the condition that dots have been displayed on the screen, the zoom position controller 310 displays dots on corresponding positions of the screen. Then, the zoom scale controller 320 determines the size the zoom window based on the inputted external data. Following the operation of zoom scale controller 320, the edge bar generator 330 generates an edge bar on a still picture displayed on the screen, so as to form the zoom window.

In case of the PAL system screen with 700 pixels (H)×287 lines (L), the edge bar is displayed to have an outline thickness of 3 lines ×6 pixels. The zoom window has an aspect ratio of 4×3 identical to those of TV screens. This zoom window can be enlarged at the aspect ratio of 4×3, based on scale factors.

Figure 5A:
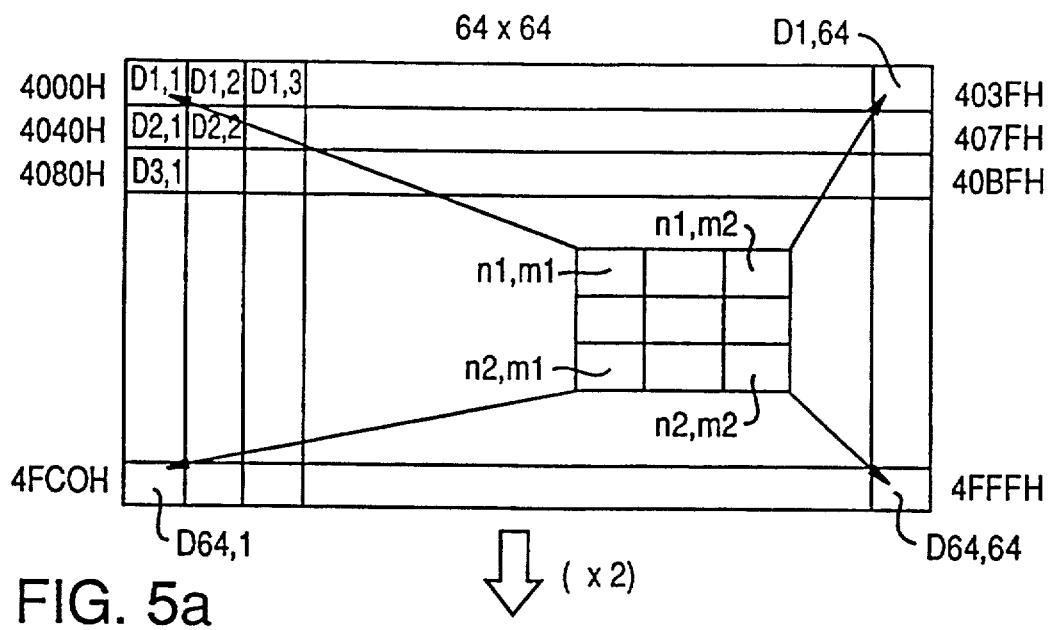
FIGS. 5a to 5c are schematic view illustrating video data upon reconfiguring a zoomed region as one picture.
Figure 5B:
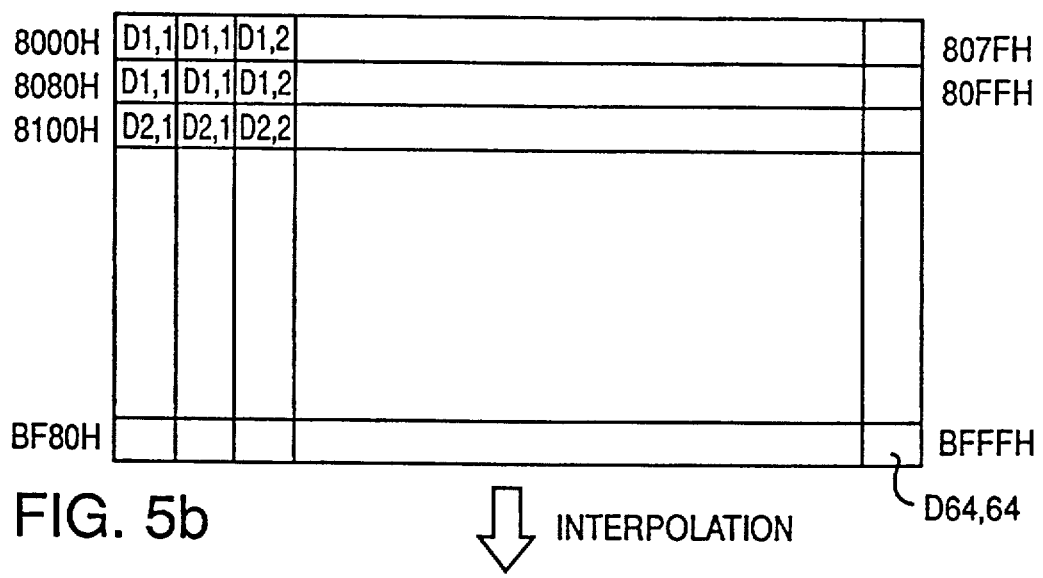
Figure 5C:
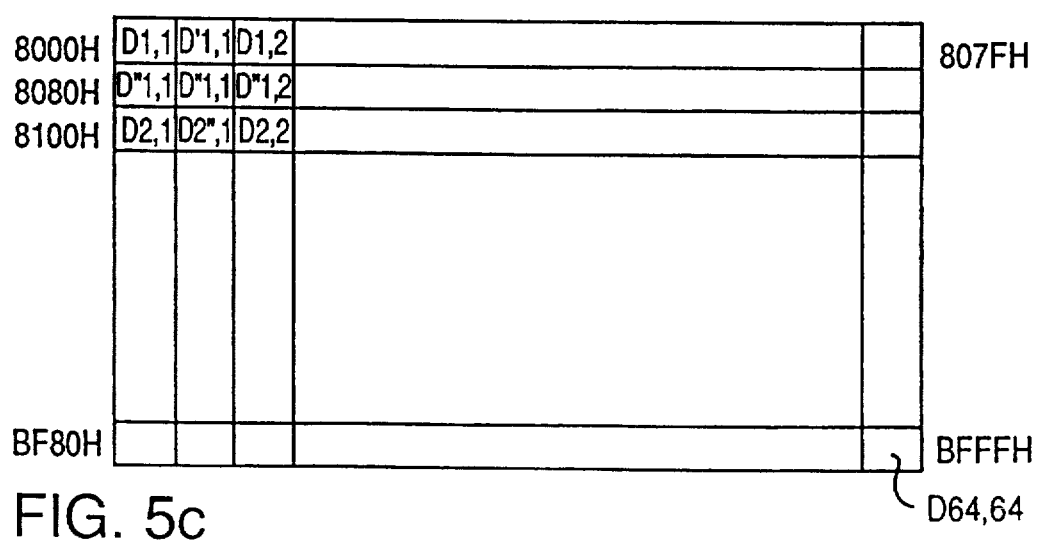

FIGS. 5a to 5c are schematic views illustrating the procedures of zooming video signals in the zoom window by the zoom region size controller 340, based on zoom scale factors. FIG. 5A shows the relation that position values in the zoom window correspond to pixel data $D_{x,y}$ in the memory, respectively. In case of data of 64×64 pixels, the position data n1m1 corresponds to the pixel data $D_{1,1}$, the position data n1m2 the pixel data $D_{1,64}$, the position data n2m1 the pixel data $D_{64,1}$, and the position data n2m2 the pixel data $D_{64,64}$.

Where pixel data corresponding to the matrix position values are double zoomed, as shown in FIG. 5a, the addresses 4000H to 4FFFH for pixel data in the memory are converted into addresses 8000H to 8FFFH by a refresh memory in the zoom region size controller 340. Accordingly, the pixel data is zoomed as shown in FIG. 5b.

The pixel data double zoomed is then applied to the simulator 350. The simulator 350 interpolates adjacent pixel data, to achieve a reconfiguration of pixel data as shown in FIG. 5c.

The interpolation is carried out by taking average values of adjacent pixel data. For example, new pixel data obtained by the interpolation are $D'_{1,1}=(D_{1,1}+D_{1,2})/2$, $D''_{1,1}=(D_{1,1}+D_{2,1})/2$, and $D'''_{1,1}=(D_{1,1'}+D_{2,1'})/2$.

The video signals Yz', Uz', and Vz' zoomed, as indicated above, are applied to the second memory unit 400. The counter 410 of second memory unit 400 decimal-counts the zoomed video signals Yz', Uz', and Vz' so that they can be stored by frames in the frame memory 420.

In the zoom mode of the VCR, the first switch unit $SW_1$ is connected to an output terminal of the frame memory 420 of the second memory unit 400, according to the first control signal $CS_1$ outputted from the control signal generating unit 600. Accordingly, the zoomed digital video signals Yz', Uz' and Vz' stored in the frame memory 420 are applied to the RGB matrix circuit 500 via the first switch $SW_1$. The RGB matrix circuit 500 reconfigures the digital video signals Y', U' and V' received therein and outputs analog color signals R, G and B.

In the zoom mode, the second switch $SW_2$ is connected to an output terminal of the RGB matrix circuit 500. As a result, the analog color signals R, G and B are outputted by frames from the RGB matrix circuit 500 via the second switch unit $SW_2$. Accordingly, a still picture obtained by zooming a picture portion of the zoom window is displayed on the TV screen.

Figure 6A:
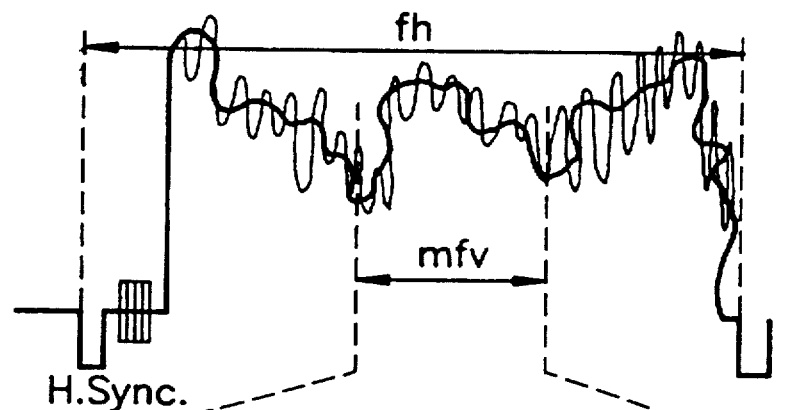
FIGS. 6a and 6b are timing diagrams illustrating filtering of video signals corresponding to the zoom region at one horizontal scanning interval.
Figure 6B:
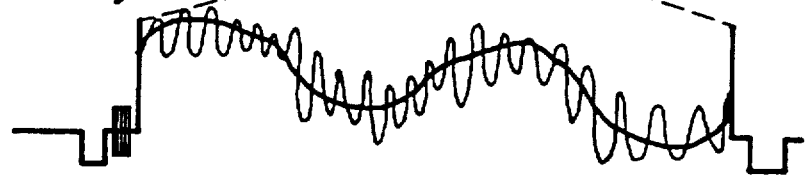
Figure 7A:
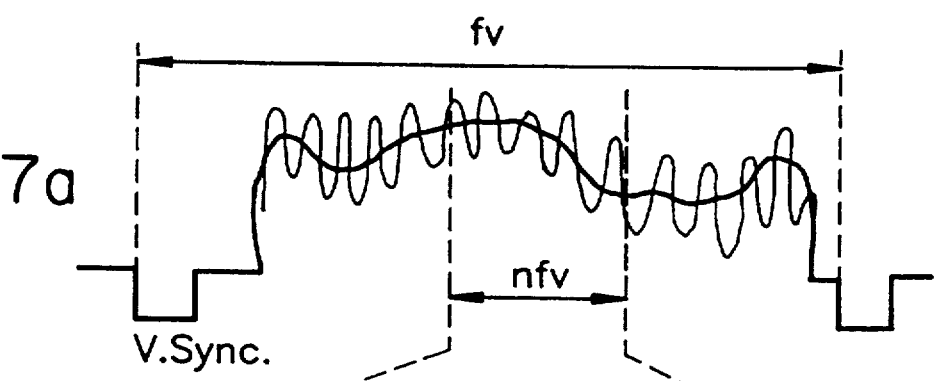
FIGS. 7a and 7b are timing diagrams illustrating filtering of video signals corresponding to the zoom region at one vertical scanning interval.
Figure 7B:
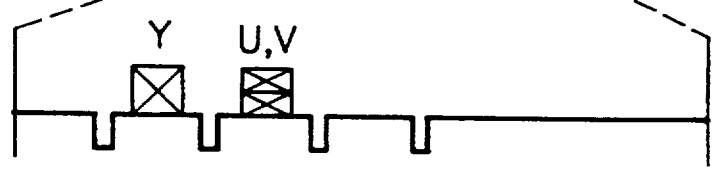

FIGS. 6a and 6b are timing diagrams illustrating filtering of video signals corresponding to the zoom region at one horizontal scanning interval $F_h$. FIGS. 7a and 7b are timing diagrams illustrating filtering of video signals corresponding to the zoom region at one vertical scanning interval $F_V$. On the other hand, FIGS. 8a to 8l are timing diagrams for explaining the interpolation of video signals by the simulator 350.

Figure 8A:
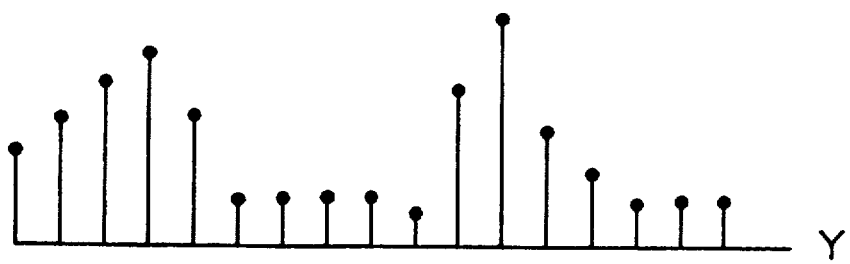
FIGS. 8a to 8l are timing diagrams for explaining the interpolation of video signals of a simulator in accordance with the present invention.
Figure 8B:
Figure 8C:
Figure 8D:
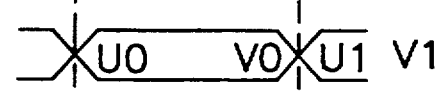
Figure 8E:
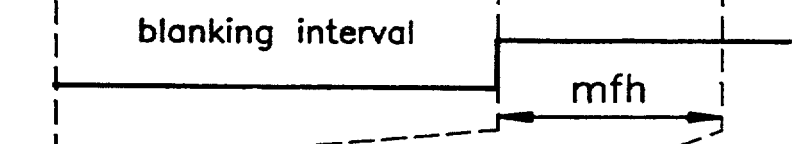
Figure 8F:

When the quantized luminance signals Y outputted from the frame memory 220 are filtered by luminance signal data $Y_0$, $Y_1$ and $Y_2$ and color difference signal data $U_0$ and $V_0$ shown in FIGS. 8c and 8d, based on reference pulses generated from the pulse generator 360 shown in FIG. 8b, only luminance signals are interpolated by the simulator 350 in the horizontal scanning interval $mf_h$ for the zoom window. This interpolation will be now described.

Figure 8G:
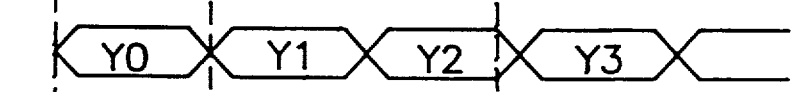
Figure 8H:
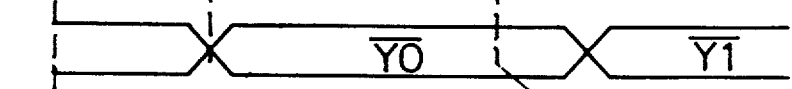
Figure 8I:
Figure 8J:
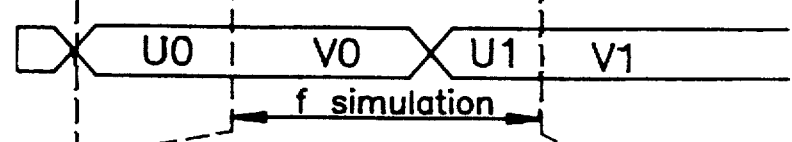
Figure 8K:

The luminance signals in the zoom window are shown in FIG. 8g. The simulator 350 interpolates each luminance signal in the zoom window with a virtual luminance signal $Y_0$, that is, a luminance signal of adjacent pixel shown in FIG. 8h and thereby produces a virtual luminance signal shown in FIG. 8k.

Figure 8L:
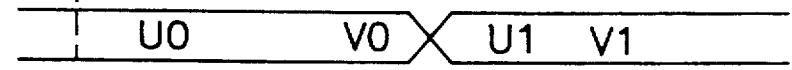

Since no interpolation is made for color difference signals, original color difference signals are obtained as shown in FIG. 8l.

Figure 9A:
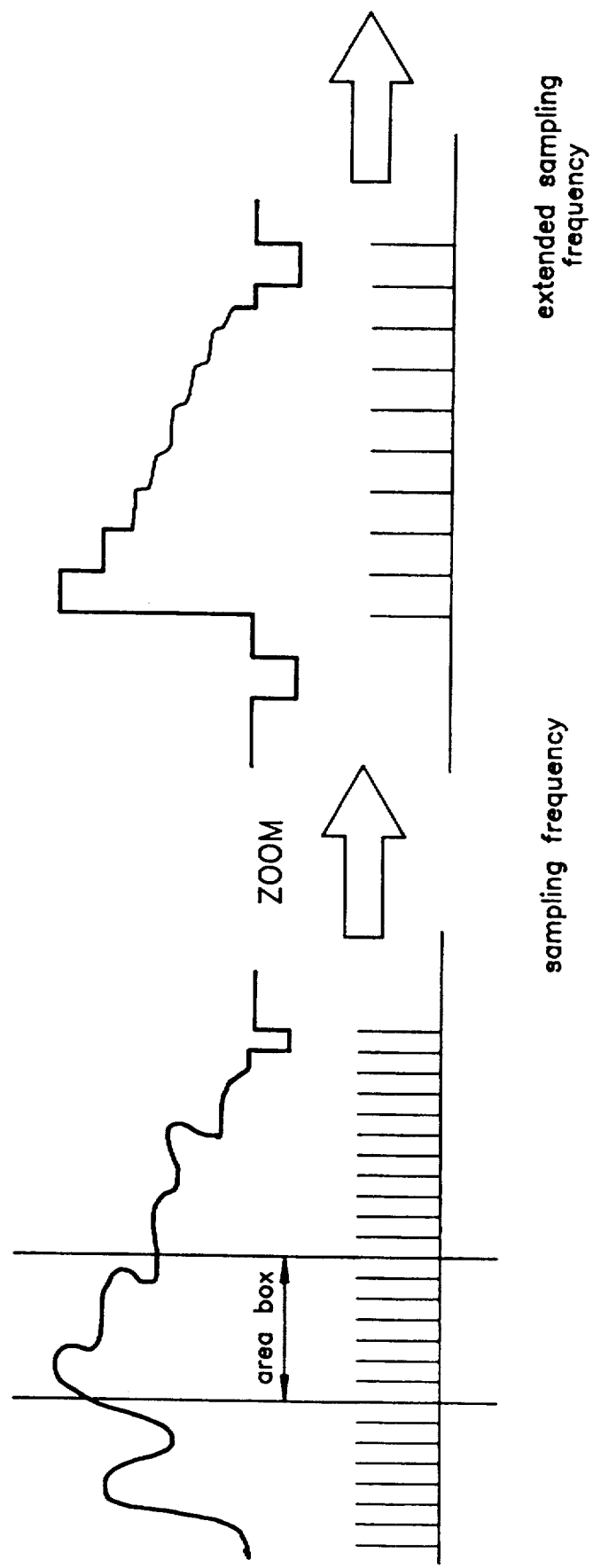

Upon zooming, sampling frequencies are extended together with video signals in the zoom window, as shown in FIG. 9a. Accordingly, video signals in portions to be mosaicked as shown in FIG. 9b is reconfigured by the simulator 350.

As apparent from the above description, the present invention makes it possible to select a region to be zoomed from a picture being displayed in the playback mode as a desired size and zoom it as one picture. Accordingly, a variety of zooming is achieved.

Since a picture is reconfigured by interpolating video signals in a zoom window in accordance with the present invention, the resolution can be improved, even though sampling intervals are increased due to zooming. In particular, pictures for education and research can be zoomed as still pictures for search with little noise.

The foregoing description of the preferred embodiment has been presented to illustrate the invention. It is not intended to be exhaustive or to limit the invention to the form disclosed.

In applying the invention, modifications and variations can be made by those skilled in the pertaining art without departing from the scope and spirit of the invention. It is intended that the scope of the invention be defined by the claims appended hereto, and their equivalents.

What is claimed is:

1. A video cassette recorder comprising:

digital signal processing means for receiving composite video signals and converting them into digital video signals;

first memory means for receiving the digital video signals from the digital signal processing means and storing them by frames therein;

zoom signal processing means for receiving digital video signals corresponding to one frame from the first memory means and zooming only digital video signals corresponding to a predetermined zoom region from the received digital video signals, so as to reconfigure them as digital video signals corresponding to one new frame;

second memory means for receiving the zoomed digital video signals from the zoom signal processing means and storing them by frames therein;

first switching means for selecting the digital video signals corresponding to one frame from the first memory means and digital video signals corresponding to one frame from the second memory means;

second switching means for selecting and outputting original composite video signals and output signals via said first switching means; and control signal generating means for receiving signals for operation modes of the video cassette recorder and generating the first control signal for controlling said first switching means, the second control signal for controlling said second switching means and the third control signal for controlling said zoom signal processing means.

2. A video cassette recorder in accordance with claim 1, wherein the digital signal processing means comprises:

a synchronous signal separation circuit for receiving composite video signals and separating synchronous signals from the composite video signals;

an analog decoder for receiving the composite video signals and the synchronous signals from the synchronous signal separation circuit and separating the composite video signals into luminance signals and color difference signals having vector phase angles, using the synchronous signals as reference signals;

a clock generator for generating clock signals;

a PLL circuit for receiving the color difference signals from the analog decoder and detecting phase errors of said signals and compensating them according to the synchronous signals and the clock signals; and an analog/digital converter for receiving analog luminance signals from said analog decoder and the compensated analog color difference signals from said PLL circuit and converting them into digital luminance signals and digital color difference signals.

3. A video cassette recorder in accordance with claim 1, wherein the zoom signal processing means comprises:

a zoom scale controller for receiving data applied externally and outputting zoom scale factors to predetermine the area of a zoom window;

a zoom region position controller for receiving the digital video signals corresponding to one frame from the second memory means, generating dots according to the third control signal from the control signal generating means and controlling position of the dots according to the externally applied data;

an edge bar generator for receiving output signals from the zoom scale controller and zoom region position controller and generating edge bars according to the received signals, so as to form the zoom window;

a zoom region size controller for zooming digital video signals in the zoom window formed by the edge bar generator according to the zoom scale factors outputted from the zoom scale controller, so as to produce video signals corresponding to one frame;

a simulator for receiving the video signals corresponding to one frame from the zoom region size controller, taking average values of data for adjacent pixels and interpolating the average pixel values; and a pulse generator for sending pulse signals to the zoom scale controller, the zoom region position controller and the simulator.

4. A video cassette recorder in accordance with claim 1, further comprising a RGB matrix circuit connected to between said first switching means and said second switching means for receiving digital video signals corresponding to one frame via the first switching means and reconfiguring them as R, G, and B color analog signals.

* * * * *